US012754785B2

(12) United States Patent
Kyparlis

(10) Patent No.: US 12,754,785 B2
(45) Date of Patent: Oct. 6, 2026

(54) CAPTURE OF HIGH BANDWIDTH RATE USB DATA IN CONSTRAINED MCU ENVIRONMENTS

(71) Applicant: JABIL INC., St. Petersburg, FL (US)

(72) Inventor: Athanasios Kyparlis, St. Petersburg, FL (US)

(73) Assignee: Jabil INC.

( * ) Notice: Subject to any disclaimer, the term of this patent is extended or adjusted under 35 U.S.C. 154(b) by 484 days.

(21) Appl. No.: 18/560,810

(22) PCT Filed: May 23, 2022

(86) PCT No.: PCT/US2022/030554

§ 371 (c)(1),
(2) Date: Nov. 15, 2023

(87) PCT Pub. No.: WO2022/246324

PCT Pub. Date: Nov. 24, 2022

(65) Prior Publication Data

US 2024/0289191 A1 Aug. 29, 2024

Related U.S. Application Data

(60) Provisional application No. 63/191,682, filed on May 21, 2021.

(51) Int. Cl.
*G06F 9/54* (2006.01)

(52) U.S. Cl.
CPC .................................... *G06F 9/542* (2013.01)

(58) Field of Classification Search
CPC ....................................................... G06F 9/542
USPC ............................................................ 710/58
See application file for complete search history.

(56) References Cited

U.S. PATENT DOCUMENTS

| | | | | |
|---|---|---|---|---|
| 10,223,101 | B2 * | 3/2019 | Riedl | H04L 67/12 |
| 12,074,776 | B1 * | 8/2024 | Gurnani | H04L 41/12 |
| 2014/0222843 | A1 | 8/2014 | Sareen | |
| 2018/0288179 | A1 * | 10/2018 | Bhatia | H04L 67/56 |
| 2019/0073373 | A1 | 3/2019 | Surale | |
| 2019/0369984 | A1 | 12/2019 | Malladi | |
| 2020/0128094 | A1 | 4/2020 | De Lavarene | |

(Continued)

FOREIGN PATENT DOCUMENTS

KR 101928400 12/2018

OTHER PUBLICATIONS

Extended European Search Report issued in App. No. EP22805664, dated Sep. 25, 2024, 5 pages.

(Continued)

*Primary Examiner* — Christopher B Shin
(74) *Attorney, Agent, or Firm* — Riverside Law LLP

(57) ABSTRACT

A constrained master controller unit system for use in an internet-of-things device that applies machine learning. The system includes at least a data ingester, a data processor operable alternately with the data ingester in a respective pause/go/pause/go and go/pause/go/pause matched sequence; and a header preview for incoming data, wherein parameters, including at least timing and data volume, for the matched sequence are automatically selected based on the header preview. The non-header data is not processed by the header preview, and is processed by the data processor only during one of its respected go matched sequence.

13 Claims, 5 Drawing Sheets

(56) References Cited

U.S. PATENT DOCUMENTS

| | | | | |
|---|---|---|---|---|
| 2020/0296186 | A1* | 9/2020 | Lau | H04L 43/062 |
| 2024/0289191 | A1* | 8/2024 | Kyparlis | G06F 9/542 |

OTHER PUBLICATIONS

Massimo Merenda et al: “Edge Machine Learning for AI-Enabled IoT Devices: A Review”, SENSORS, [Online] vol. 20, No. 9, Apr. 29, 2020 (Apr. 29, 2020), p. 2533, XP093202764, CH ISSN: 1424-8220, DOI: 10.3390/s20092533 Retrieved from the Internet: URL:https://www.ncbi.nlm.nih.gov/pmc/articles/PMC7273223/pdf/sensors-20-02533.pdf> [retrieved on Sep. 6, 2024].

* cited by examiner

System functional flow

CAPTURE OF HIGH BANDWIDTH RATE USB DATA IN CONSTRAINED MCU ENVIRONMENTS

CROSS-REFERENCE TO RELATED APPLICATION

This application is a national stage application of International Patent Application No. PCT/US2022/030554, filed May 23, 2022, entitled "CAPTURE OF HIGH BANDWIDTH RATE USB DATA IN CONSTRAINED MCU ENVIRONMENTS", which claims the benefit of priority to U.S. Provisional Application No. 63/191,682, filed May 21, 2021, entitled "CAPTURE OF HIGH BANDWIDTH RATE USB DATA IN CONSTRAINED MCU ENVIRONMENTS", each of which is incorporated herein by reference as if set forth in its entirety.

BACKGROUND

Low- to Mid-range capability MCUs (similar to ARM Cortex M4) do not have the CPU power to consume high rate USB 2.0 data, such as 60 Frames-per-Seconds (FPS) HD video (upwards of 7 Mbytes/s), even if the receiving circuit is compliant with USB2.0 and can ingest data at such rates. Typical ARM Cortex M4 implementations are limited to ~3.6 Mbytes/s due to CPU processing and memory copy performance constraints. Herein throughout, such systems are referred to as "constrained MCU systems". Such a system has typically limited RAM (<=2.5 MB) and flash (<=8 MB) available, with a CPU system clock of 200 Mhz or less.

In the known art, this issue is sometimes solved through the use of higher capability, higher cost MCUs that are capable of continuously receiving and processing video frames. Similarly, dedicated peripheral controller boards or peripherals with in-build memory are sometimes employed to address the foregoing issues. However, all such solutions add substantial costs to systems, as well as adding significant complexity in system design.

Thus, there is a need for a solution to the foregoing issues for developers of low-cost, low-capability MCU based IoT systems that need high quality, high speed video for machine learning (ML) and/or neural network (NN) processing.

BRIEF SUMMARY

A constrained master controller unit apparatus, system and method for use in an internet-of-things device that applies machine learning is disclosed. The system includes at least a data ingester; a data processor operable alternately with the data ingester in a respective pause/go/pause/go and go/pause/go/pause matched sequence; and a header preview for incoming data, wherein parameters, including at least timing and data volume, for the matched sequence are automatically selected based on the header preview. The non-header data is not processed by the header preview, and is processed by the data processor only during one of its respected go matched sequence.

BRIEF DESCRIPTION OF THE DRAWINGS

The exemplary apparatuses, systems, and methods shall be described hereinafter with reference to the attached drawings, which are given by way of non-limiting example only, and in which.

DETAILED DESCRIPTION

Figure 1:
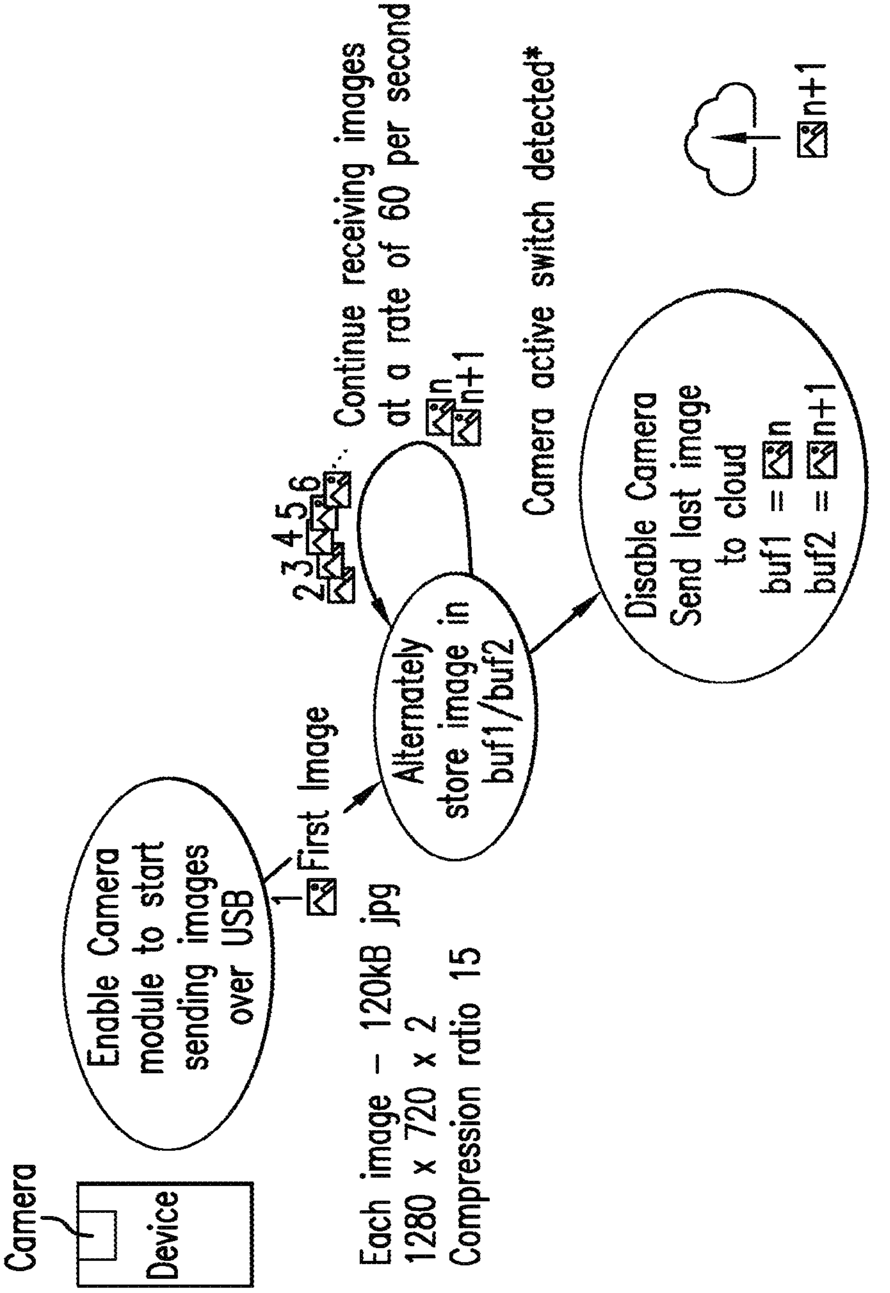
FIG. 1 illustrates aspects of the embodiments.
Figure 2:
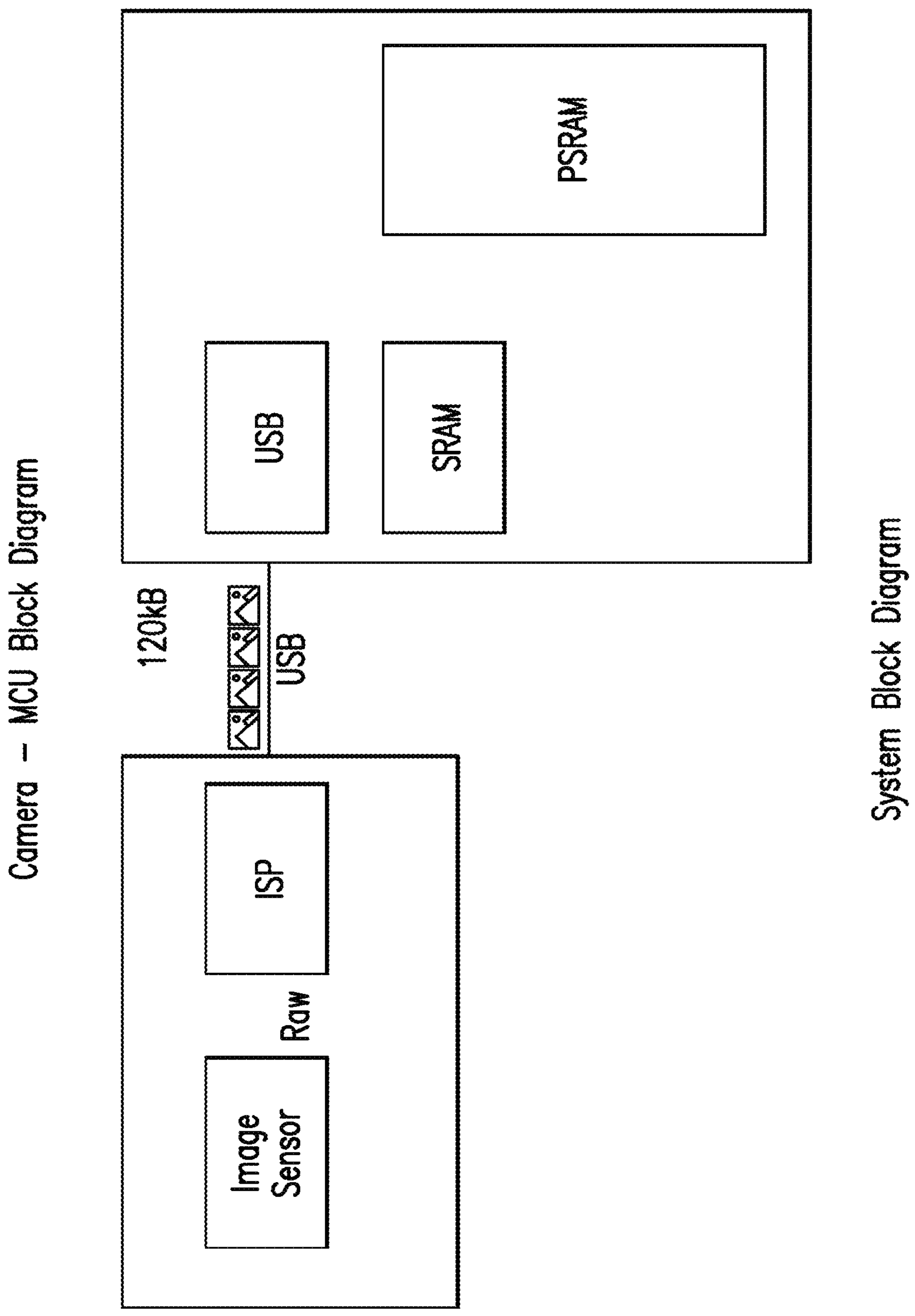
FIG. 2 illustrates aspects of the embodiments.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on," "upon," "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The embodiments provide several advantages over the known art. More particularly, the embodiments:

1) alleviate low-cost MCU CPU and memory-write performance constraints during high-bandwidth USB operations for non-streaming applications;
2) allow Cortex-M4 or similar MCUs to process data from cameras with 60 FPS 1280×720 2-byte/per pixel compressed video output or equivalent (~7.2 MB/s data rate), quality which is desirable in image acquisition for machine learning use cases;
3) alleviate performance issues for low-cost MCUs in the above-referenced applications, while allowing other time-critical tasks to execute normally; and
4) achieve high bandwidth rates and lossless reception of, for example, 60 FPS 1280×720 2-byte/pixel compressed video (~7.2 MB/s data rate), for up to a fixed number of frames with assured memory availability.

The foregoing capabilities are highly valuable in video/image-capable IoT solutions that apply machine learning or neural network processing 'at-the-edge' on a constrained MCU system to incoming real-time imaging based on an external trigger. In short, the embodiments achieve these results through a two-fold approach.

In the first aspect, a pause/go/pause/go approach is applied to data ingestion, then data processing, then data ingestion, then data processing, and so on. In the second aspect, the characteristics of this data ingestion/pause ingestion and process data/data ingestion/pause ingestion and process data/ . . . bifurcation may be modified based on a "header preview" in which incoming data/data packets are reviewed on a header-only for information in the header that may indicate increased efficiency if minor modifications are made to the characteristics (i.e., timing, data volume, etc.) of the pause/go/pause/go/ . . . process.

More specifically, in the first aspect, there is a decoupling of raw data ingestion from higher-protocol processing to minimize memory copies (a critical performance constraint in low-capability systems). In the second aspect, there is a peeking into USB data packet header information to ascertain the number and size of higher-protocol units (e.g. video frames), allowing monitoring/control of the data stream without the penalty of processing the data completely.

Figure 3:
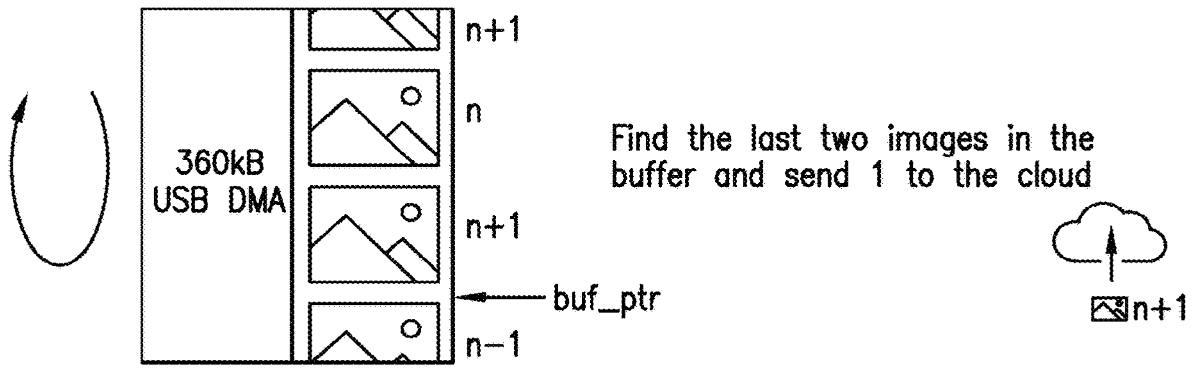
FIG. 3 illustrates aspects of the embodiments.
Figure 4:
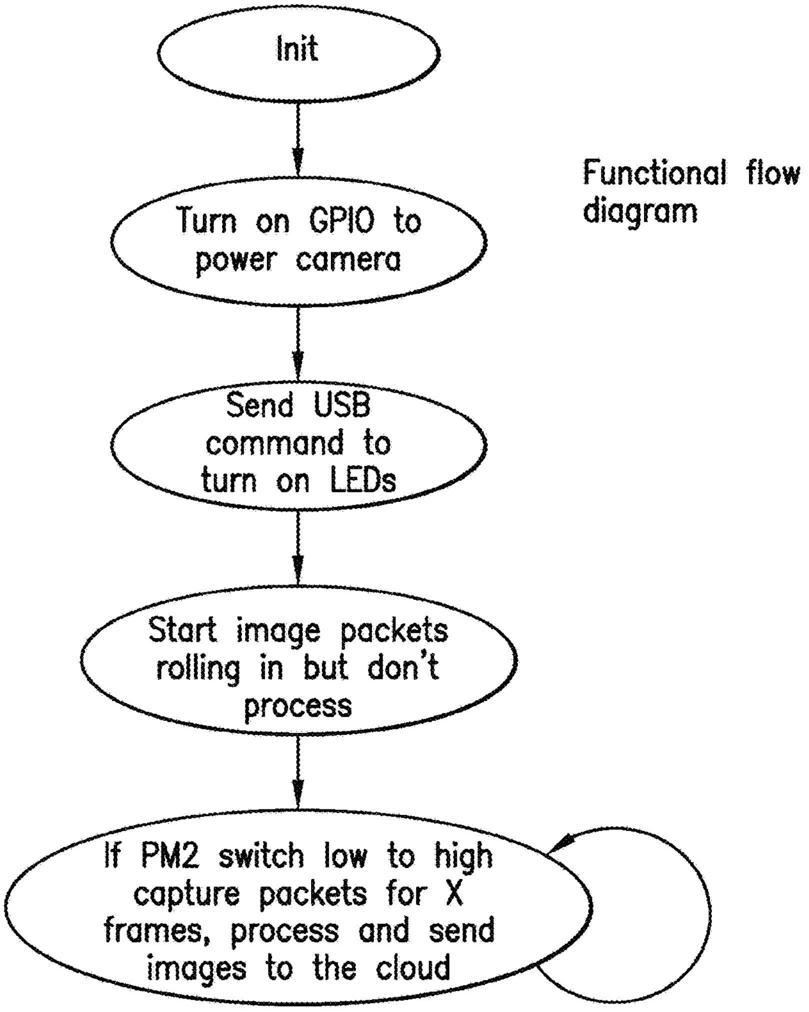
FIG. 4 illustrates aspects of the embodiments.
Figure 5:
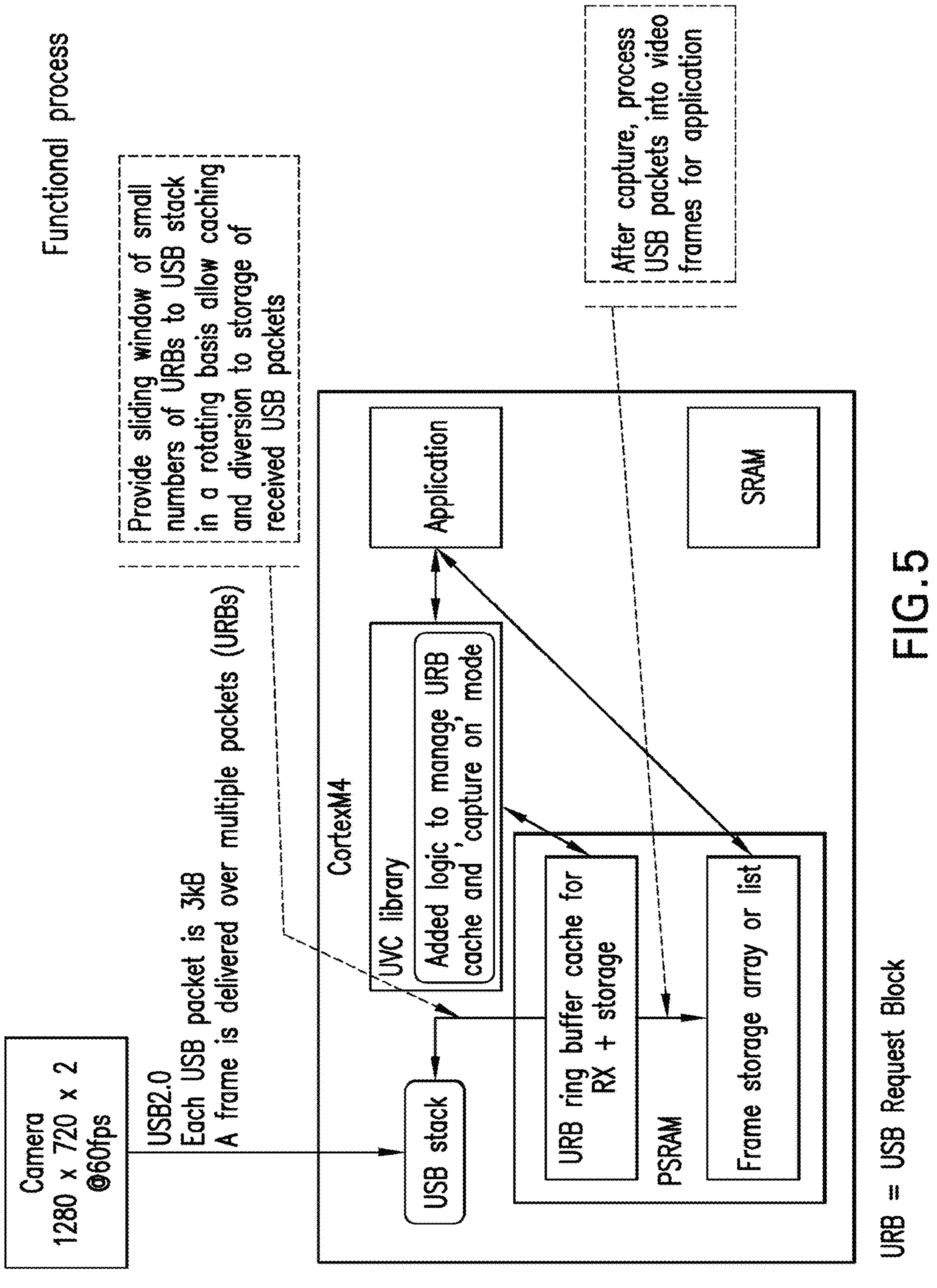
FIG. 5 illustrates aspects of the embodiments.

This is achieved, in part through, and as evidenced in FIGS. 3-5 as compared to FIG. 1 by:

a) Disabling post-ingestion processing of raw data until upper layer software requests a capture of specific number of higher-protocol units (e.g. video frames). This is done in the layer above USB stack, for example the UVC stack for video;
b) Offering a 'capture on' API with 'number of units' as parameter to activate ingestion and storage of USB raw data packets;
c) Decoupling ingestion of raw USB packets from further processing allows minimization of memory copies during the time-critical period of data ingestion;
d) Peeking into USB packet headers to ascertain the number of higher-protocol units (e.g. video frames) received and their size which is an indication of their viability and can be used for filtering;
e) Terminating ingestion of raw packets when enough raw packets have been received containing the desired number of frames. Frame termination/start is determined as described in (d); and
f) Processing cached packets and forward to upper layers that requested the input.

This approach has several benefits. Among these benefits are the ability to interface high-speed, high-bandwidth peripherals with low-capabilities MCUs for non-streaming use cases; and the ability to limit CPU load during non-capture mode, which allows other time-critical tasks to proceed, like driving screens, RF connectivity, and GPIO handling, by way of non-limiting example.

Figure 6:
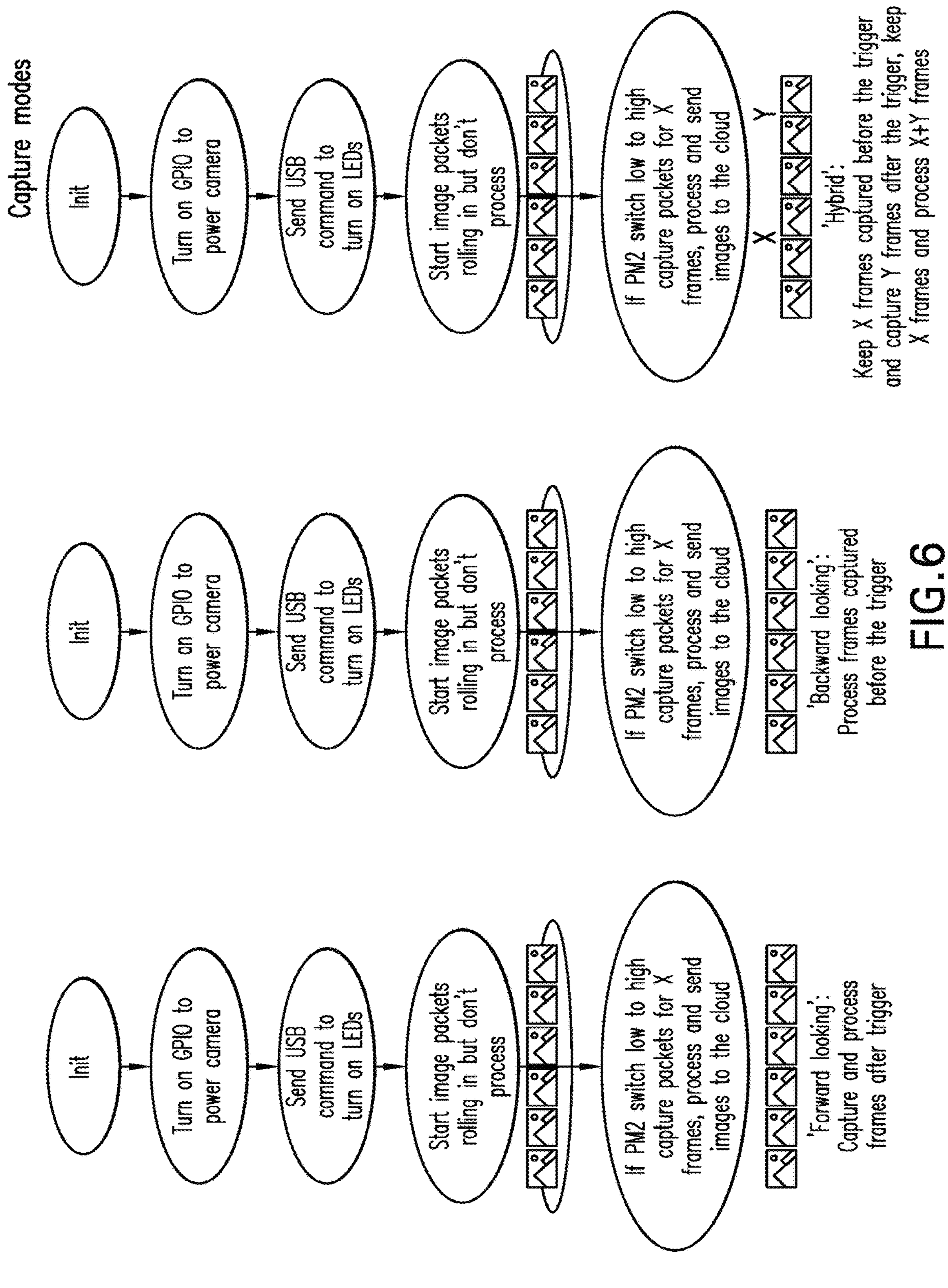
FIG. 6 illustrates aspects of the embodiments.

As shown in FIG. 6, the 'capture on' trigger can be operated in at least three modes, by way of non-limiting example:

'backward-looking': it uses packets already received and retrieves enough UVC video frames (or other higher-protocol frames) from these packets;

'forward-looking': it captures new packets until enough higher-protocol units (e.g. video frames) have been received; and hybrid of above two modes wherein some higher-protocol units (e.g. video frames) are retrieved from existing packets and some from newly received ones.

In any such camera-plus-MCU system, there are various built-in latencies from the capture signal sensor and camera buffering to the real-time of frame capture. The above modes allow for fine-tuning the end-to-end system to capture a frame from a specific moment in the device's operational sequence.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather are to be accorded the widest scope consistent with the principles and novel features disclosed herein.

What is claimed is:

1. A constrained master controller unit system for use in an internet-of-things device that applies machine learning, having a random access memory capability of less than or equal to 2.5 MB, a flash memory capability of less than or equal to 8 MB, and a system clock rate of 200 MHz or less, comprising:

a data ingester;

a data processor operable alternately with the data ingester in a respective pause/go/pause/go and go/pause/go/pause matched sequence;

a header preview for incoming data, wherein parameters, including at least timing and data volume, for the matched sequence are automatically selected based on the header preview;

wherein non-header data is not processed by the header preview, and is processed by the data processor only during one of its respected go matched sequence.

2. The system of claim 1, wherein the parameters of the matched sequence decouple raw data ingestion from higher-protocol processing to minimize memory copies.

3. The system of claim 1, wherein the header preview is in relation to a USB data packet header.

4. The system of claim 1, wherein the header preview ascertains at least a number and size of higher-protocol units.

5. The system of claim 4, wherein the higher protocol units are video frames.

6. The system of claim 1, wherein non-header data is divided, and is processed by type only during select ones of the go matched sequence of the data processor.

7. The system of claim 6, wherein higher protocol data is processed more rarely than lower protocol data during the go matched sequences.

8. The system of claim 7, wherein the higher protocol data is only processed upon request from upper processing layers.

9. The system of claim 1, wherein the timing of the respective go and pause matched sequences of the data ingester and the data processor is unequal.

10. The system of claim 1, wherein the timing of the respective go and pause matched sequences of the data ingester and the data processor is equal.

11. The system of claim 1, wherein the header preview indicates data viability.

12. The system of claim 1, wherein the go sequence of the data processor is backward-looking with respect to the header preview.

13. The system of claim 1, wherein the go sequence of the data processor is forward-looking with respect to the header preview.

* * * * *